Dec. 17, 1957   W. G. HODSON ET AL   2,816,720
INCREMENTAL REMOTE RADIO CONTROL SYSTEM
Filed Oct. 11, 1950   3 Sheets-Sheet 2

INVENTORS:
WALDO G. HODSON
WALTER E. PETERSON
HOWARD H. KENKEL
JACOB J. HAGOPIAN
STUART R. HENNIES

BY Hubert E. Metcalf
THEIR PATENT ATTORNEY

Dec. 17, 1957     W. G. HODSON ET AL     2,816,720

INCREMENTAL REMOTE RADIO CONTROL SYSTEM

Filed Oct. 11, 1950     3 Sheets-Sheet 3

INVENTORS:
WALDO G. HODSON
WALTER E. PETERSON
HOWARD H. KENKEL
JACOB J. HAGOPIAN
STUART R. HENNIES

BY Herbert E. Metcalf

THEIR PATENT ATTORNEY

United States Patent Office 2,816,720
Patented Dec. 17, 1957

2,816,720

INCREMENTAL REMOTE RADIO CONTROL SYSTEM

Waldo G. Hodson, Burbank, Walter E. Peterson, Los Angeles, Howard H. Kenkel, La Canada, Jacob J. Hagopian, Los Angeles, and Stuart R. Hennies, Inglewood, Calif., assignors to Northrop Aircraft, Inc., Hawthorne, Calif., a corporation of California Application October 11, 1950, Serial No. 189,514

7 Claims. (Cl. 244—14)

This invention relates to remote control systems, and more particularly, to an improved remote radio control system especially adapted for aircraft, wherein the control signals are in increments, or pulses, rather than being continuously proportional.

In position or attitude control systems, the rate and extent of movement of the controlled member must be proportional to the displacement of the controlling member throughout the operating range. However, when accuracy of response is desired at all times, even for minute control variations, in anything except a positively connected system, a continuously proportional control method has certain well recognized disadvantages. This is true in the case of a remote radio control system for an aircraft, for example, where the accuracy of the control link is dependent on such factors as signal frequency changes, variations in power supply, variable electrical characteristics of components, and possible spurious signals resulting from noise disturbances. The disadvantage of "zero-drift" causes the controlled object to be undesirably out of position from the setting of the control members.

For instance, if control movements and settings are designed to be in accordance with the frequency of an incoming wave, drifting of the frequency from any preset value will produce the same effects as if the input setting were purposely changed. Again, if the controlled device or function depends on the instantaneous amplitude of a continuously applied signal, unavoidable variations in amplitude proportionately cause unwanted changes in the response of the device. In the case of a remote radio control system, a separate feedback loop would be required to maintain exact synchronization between the initial controlling member and the controlled device. Without this extra feedback loop the operator does not know how far he has moved the controlled device, nor whether the device is actually responding correctly to the control input signals.

It is an object of the present invention to provide a remote control system for an aircraft wherein zero-drift is eliminated, thereby rendering the attitudes of the aircraft exactly in correspondence with the settings or indications of the controller and allowing no attitude changes which have not been specifically introduced by the controller.

In addition, it is a further object to provide a control system, which attains the above object, and which possesses smooth operating characteristics effectively giving the required proportionality of control at all positions between the operating limits.

Another object is to provide a manually-controlled pulse-operated control system in which means are provided to insure a whole number of electrical pulses being formed, whenever a control signal is effected, so that proper response of the pulse-actuated system is assured.

A still further object of this invention is to provide a remote radio control system wherein a single radio transmitter and receiver can be used for conveying intelligence in two separate forms, differing with respect to width of control signal pulse; the signal pulses of one width being automatically prevented from interfering with the proper functioning of the device designed to act in accordance with the signal pulses of another width.

Briefly, our invention comprises means for producing on-off control pulses, a remote transmitter for relaying these pulses to a receiver mounted in an aircraft whose attitude is to be controlled, and means for automatically transferring the pulses into incremental control movements of an attitude controlling member in the aircraft. The control increments are made small enough so that the system provides a continuously variable control in effect. The necessary plurality of control functions are established by means of separate audio frequency modulation channels, together with tuned filters at the receiving end for decoding and applying the control pulse signals to the proper controlling equipment.

A novel combination of relays, switches, and holding contacts is provided as means for eliminating fractional pulses from being transmitted, and a time-constant detector circuit is provided in the output of the receiver to differentiate between signals having control tone pulses of different widths, both of these features to be described in detail hereinafter.

The invention may be more fully understood by reference to the accompanying drawings, wherein.

Figure 1:
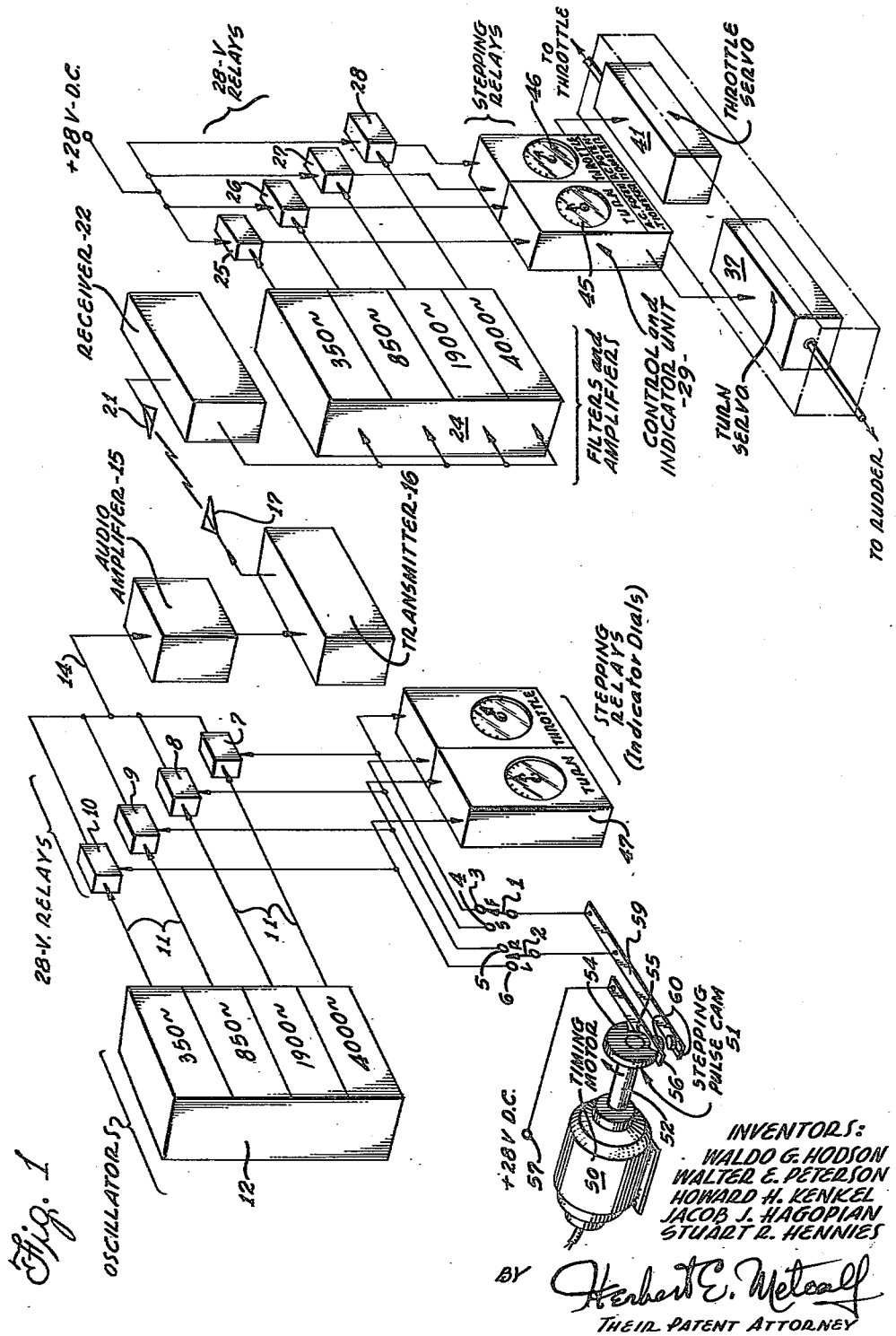
Figure 1 is a diagram which shows, in block form, the particular combination of components in which this invention resides, from the remote transmitter control station to the actuating motors in the controlled craft.

In Figure 1, a pair of single pole, double throw control switches 1 and 2 with center "off" positions are connected to actuate the throttle and turn control devices, respectively, in a remotely controlled aircraft, as will be shown herein. The left and right contact positions of the throttle control switch 1 are "slow" and "fast" respectively, while corresponding positions of the turn control switch 2 are "left turn" and "right turn" respectively, as marked on the drawing by single letters. Any number of additional control switches can be similarly used, of course, such as one for bank angle, one for pitch angle, or the like, the present two being shown for example only.

The poles of the control switches 1 and 2 are both adapted to be connected to a source of D. C. voltage, as will be described later. Each control switch contact 3, 4, 5 and 6 is electrically connected to the actuating coil of individual oscillator relays 7, 8, 9 and 10 respectively. One of the operating contacts of each oscillator relay is electrically connected by one of separate input wires 11 to the output of one of four audio oscillators 12. In this particular embodiment, the four oscillators are continuously operating at respective frequencies of 350, 850, 1900 and 4000 cycles per second, as indicated. When the oscillator relays 7–10 are non-actuated, the input wires 11 are dead-ended in the relays.

The other operating contact of each relay 7–10 is electrically connected to a common amplifier line 14 entering an audio amplifier 15 prior to feeding the audio tone, if present, into a transmitter 16 for modulation of the usual carrier wave. When actuated, each oscillator relay 7–10 closes its operating contacts to connect its respective input wire 11 to the amplifier line 14.

Thus it is seen that when, for example, the throttle control switch 1 is thrown to its right-hand contact 3, assuming operating voltage on the pole, the 4000-cycle oscillator relay 7 will be actuated to complete a 4000-cycle tone circuit to the amplifier 15 and transmitter 16 for radiation from the transmitter antenna 17. When the control switch returns to its center "off" position, the transmission of the 4000-cycle signal will cease, due to opening of the oscillator relay 7.

Figure 2:
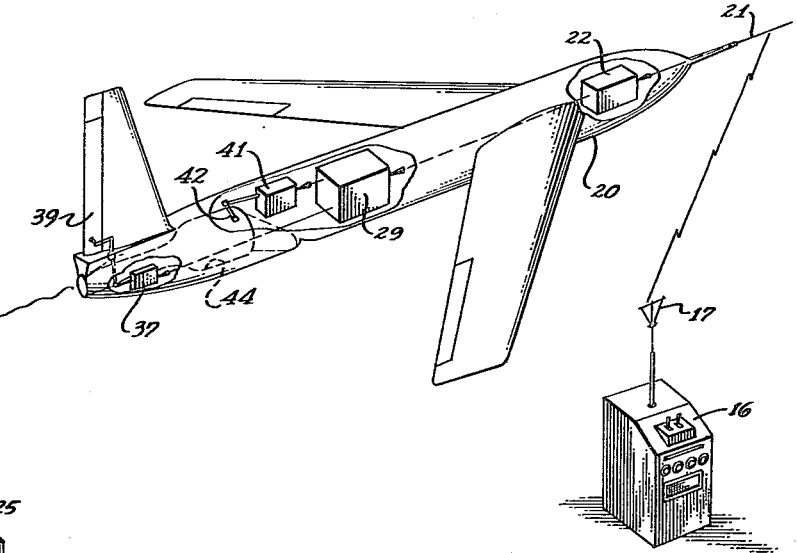
Figure 2 is a perspective view of an aircraft with throttle and rudder under control from a remote ground station, diagrammatically showing the transmitting and airborne equipment.

The transmitting equipment, as described, may be located at a ground station, as shown in Figure 2, or be mounted in a "chase" car or airplane, or duplicated in several locations for alternate control. In an airplane 20, or other device to be remotely controlled, the transmitted signal is picked up by a receiver antenna 21, and the equipment to be used following the antenna is also installed in the airplane 20.

After being demodulated and amplified in a conventional receiver 22, the signals are fed to the input of selective filters 24, as best shown in Figure 1, which pass or reject any particular audio tone according to its frequency. The filters 24 are individually tuned to the same frequencies as the oscillators 12 so that a 4000-cycle signal, for example, will be passed by the 4000-cycle filter only, as is well known.

The output of each filter is further amplified and then led to the actuating coil of one of four control relays 25–28. One operating contact of each control relay is supplied with a positive D. C. voltage and the other operating contact is electrically connected to operate a pilot's control and indicator unit 29 when the operating contacts are closed.

Figure 3:
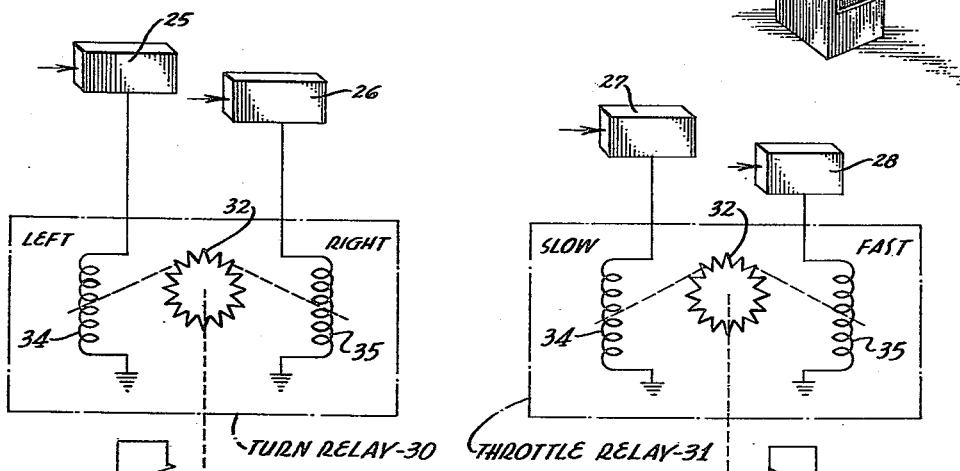
Figure 3 is a partial wiring diagram showing in greater detail the circuits which give incremental movements to the actuating motors in the controlled craft.

In the control and indicator unit, as further shown in Figure 3, appear two ratchet, or stepping relays 30 and 31, each having a ratchet wheel 32 and two oppositely connected actuating coils 34 and 35. These stepping relays are of the conventional type wherein energization of the left-hand coil 34, in each, turns its ratchet wheel 32 one notch in one direction, while energization of the right-hand coil 35, in each, turns its ratchet wheel 32 one notch in the opposite direction.

In the turn stepping relay 30, it is the ungrounded end of each coil which is respectively connected to the 350 and 850-cycle control relays 25 and 26, and the coils of the throttle stepping relay 31 are likewise connected to the 1900 and 4000-cycle control relays 27 and 28. It is, therefore, evident that when one of the control relays is actuated by means of a signal voltage through a filter, the stepping relay coil connected with that control relay will be energized to produce a one-step rotation of the associated ratchet wheel. When the signal voltage, comprising an on-off pulse, is terminated, the stepping relay mechanism resets itself for the next incoming pulse, leaving the ratchet wheel in the new position. It is obvious that both stepping relay coils connected to one ratchet wheel can never be simultaneously energized, since the transmitter control switch 1 or 2 for both these coils can be in only one position at a time.

Attached to rotate with the ratchet wheel of the turn relay 30 is the movable arm of a turn potentiometer 36, which supplies a control signal to a turn servo 37 connected to move a rudder 39 of the airplane 20 for turn control. Many types of servo mechanisms can be controlled in this manner. In the preferred embodiment of this invention, the turn servo 37 is a component of an electrical automatic pilot installation, with the turn potentiometer 36 and its movable arm merely taking the place of the turn knob on the normal pilot's controller unit.

Similarly, the movable arm of a throttle potentiometer 40 is connected to be mechanically rotated with the ratchet wheel in the throttle relay 31, to supply the input signal to a throttle servo 41 for moving a throttle 42 of the aircraft engine 44. Again, many different throttle controllers can be used.

As shown in Figure 1, a turn indicator dial 45 and a throttle indicator dial 46 are included in the control and indicator unit 29. These dials are merely connected to follow the ratchet wheels of the respective stepping relays for visual checking of the system and are not necessary for successful automatic control.

To provide constant indications of throttle setting and turn angle to the remote operator, a duplicate set of stepping relays and indicator dials is preferably provided in an indicator assembly 47 and wired directly to the control switches 1 and 2 in parallel with the oscillator relays 7–10.

In overall operation of the complete system, it can be seen that the steps made by the ratchet wheels and potentiometer arms give control changes in the form of definite increments of motion. They are definite because sufficient energy is provided to close the necessary relays when the control switches are operated. By relay action, the stepping potentiometers are moved the same amount each time a control switch is closed and opened. Since the pulses are actually on-off signals, continuous stable operation is not depended on for keeping the rudder or throttle servo control members in a certain steady position, and zero-drift is entirely eliminated from the radio control link.

By governing the travel of each potentiometer arm per step, small or large control increments are enabled. In one embodiment of the present invention, a throttle controller and a pitch controller each are provided with 79 steps within the normal operating range. As mentioned in the summary of invention, this accomplishes, in practice, the effect of a continuously variable control in making the response smooth and proportional to input displacement. The rate of response can also be proportional since the stepping relays will operate fast or slow in accordance with a high or low frequency of control pulse generation.

Referring again to Figure 1, we prefer to initiate the control pulses automatically, after closing one of the control switches, by the use of a timing motor 50. This motor running at a predetermined speed, which may be varied if desired, revolves a stepping pulse cam 51 driven by a motor shaft 52. The pulse cam 51 comprises a large radius sector 54 extending appreciably more than half way around the cam periphery, and a small radius sector 55 completing the cam periphery. Spring-loaded to follow the surfaces of the sector 54 or 55 is a movable switch blade 56 permanently connected to a power source 57. A stationary switch blade 59 positioned opposite the movable blade 56 is separated therefrom when the movable blade 56 is riding on the small radius sector 55, and the two blades make contact by means of contact points 60 thereon when the movable blade 56 is riding on the large radius sector 54. The stationary switch blade 59 is electrically connected to the poles of control switches 1 and 2.

Therefore, with the contact points 60 alternately making and breaking, a series of pulses is continuously provided at both control switches 1 and 2. Closing either of the control switches to one of its operating contacts then feeds a stream of control pulses through the system until the switch is returned to its "off" position. Each of the transmitted pulses causes one increment of change of the controlled attitude, as described previously. The pulse-forming motor, cam, and associated contacts eliminate the necessity of manually closing and opening the control switches once for each small increment of control.

However, the present invention is not limited to use in connection with these pulse forming means. If they are not used, the power source 57 is connected directly to the poles of both control switches 1 and 2. Any other switch actuating means may be used, as desired, such as for example, the control keyer shown, described and claimed in the copending application of Hagopian et al., Serial No. 152,042, filed March 27, 1950.

If either control switch 1 or 2 is closed during some instant when the contact points 60 are closed, or if either control switch is opened to the "off" position while the contact points 60 are still closed, the result obtained with the circuit of Figure 1 would be the transmission of a partial length pulse which might or might not produce a sufficient signal to actuate the stepping relay in the aircraft 20. To insure that a whole pulse or a whole number of pulses will be produced each time a control switch is operated and released, the circuit of Figure 4 is used ahead of the oscillator relays 7–10.

Figure 4:
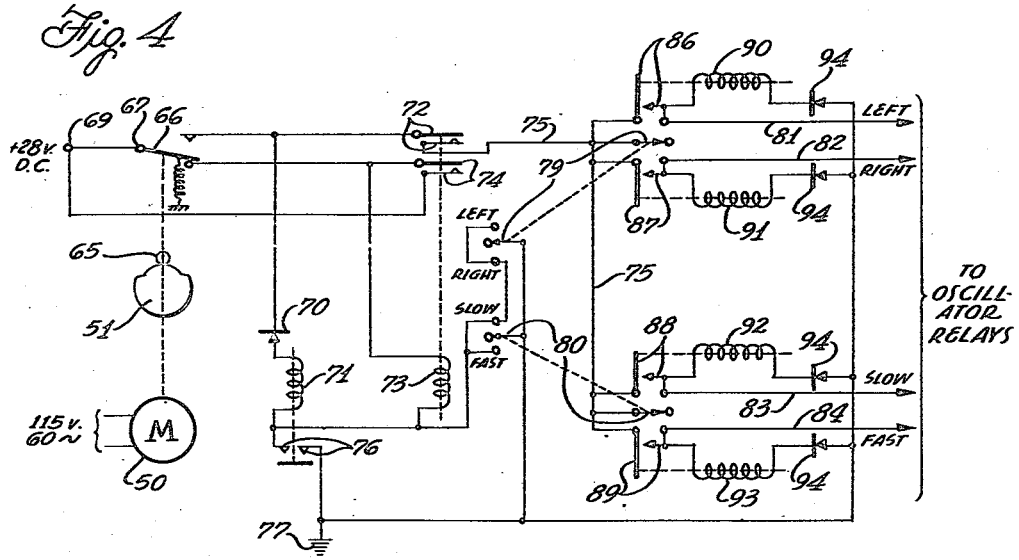
Figure 4 is a schematic wiring diagram showing a preferred means for producing control tone pulses of constant time duration regardless of the instants that manually operated switches are actuated in the system of Figure 1.

Referring to Figure 4, the timing motor 50 revolves the pulse cam 51 at a continuous constant speed. A cam follower 65 is connected to a keying switch 66 to alternately position this switch in upper and lower contact positions, in accordance with the larger or smaller radius surface, respectively, of the cam 51. Operation of the keying switch 66 thus establishes an automatic pulsing rate of the system.

The pole 67 of the keying switch 66 is connected to an electrical power source 69, such as a positive 28 volts D. C. supply line, for example. The "up" position of the keying switch is connected through a selenium rectifier 70 to one end of a first starting relay 71, and to one of the upper contacts 72 of a second starting relay 73. The "down" position connects to one of the lower contacts 74 of the second starting relay 73, and to one end of the second starting relay coil. The other lower contact of the second starting relay 73 connects to the power source 69, and the other upper contact connects to a feeder wire 75. The lower ends of both starting relays 71 and 73 are connected to each other and to a set of sustaining contacts 76 which are closed by actuation of the first starting relay 71 to connect the relay lower ends to the grounded side 77 of the power source 69.

Two double pole, double throw function switches 79 and 80, which take the place of the control switches 1 and 2, respectively, are both connected with one pole grounded at 77 and the other pole connected to the feeder wire 75. For the turn function switch 79, the "left turn" position connects the grounded pole to the junction of the lower ends of the starting relays 71 and 73, and connects the feeder wire 75 to a "left" output wire 81. The "left" output wire 81 leads to the 350-cycle oscillator relay 10, and carries the desired output pulses to be transmitted as described previously. In the "right turn" position, the grounded pole is again connected to the lower ends of the starting relays 71 and 73, while the feeder wire 75 is connected to a "right" output wire 82 leading to the 850-cycle oscillator relay 9. In a similar manner, the throttle function switch 80 connects its grounded pole to the same starting relays 71 and 73 in both the "slow" and "fast" positions, and the other pole of the throttle function switch connects the feeder wire 75 to a "slow" output wire 83 and a "fast" output wire 84 when in the "slow" and "fast" positions, respectively.

Also, connected between the feeder wire 75 and each respective output wire 81–84 is a set of holding contacts 86–89, respectively, each such set belonging to a separate holding relay 90–93, respectively. Each set of holding contacts 86–89 is thus connected in parallel with the respective connections made by the function switches between the feeder wire 75 and the respective output wires 81–84. One end of the energizing coil of each holding relay 90–93 is connected to its corresponding output wire 81–84 and the other ends connect through separate relay rectifiers 94 to ground 77.

In operation, it can be seen that if the function switch 79 or 80 is moved to either of its operating positions, when the keying switch 66 is in the "up" position, nothing happens so far as the output wires 81–84 are concerned, and, therefore, no signal tone is transmitted because of the open circuit introduced by the upper contacts 72 of the second starting relay 73. If the function switch is kept engaged, the second starting relay 73 is energized when the keying switch 66 moves to the "down" position as a result of cam rotation, a completed circuit being formed from the power source 69 to ground 77 through the "down" position of the keying switch 66, the second starting relay 73, and the grounded pole of the function switch 79 or 80. Due to the lower contacts 74 of the second starting relay 73 being closed when this relay is energized, the relay remains energized when the keying switch 66 returns to the "up" position, and as a result 28 volts D. C. is fed through the upper contacts 72 of the second starting relay 73, the feeder wire 75, and the ungrounded pole of the function switch 79 or 80, to one of the output wires 81–84 for operating the indicator assembly 47 and the oscillator relay corresponding to the selected switch position.

Thus, the system is keyed automatically by the keying switch 66 as long as the function switch is kept engaged, and no fractional pulse is transmitted. The function switches 79 and 80 may be operated individually or simultaneously.

If, however, the function switch 79 or 80 is released to the off position shortly after a control pulse has been initiated, the sustaining contacts 76 of the first starting relay 71, which are closed during the period when the keying switch 66 is in the "up" position, will hold the second starting relay 72 energized until the keying switch 66 leaves the "up" position. Also, at the same time, current already flowing through the affected holding relay 90—93 maintains the connection between the feeder wire 75 and the corresponding output wire 81—84 by means of one of the sets of holding contacts 86—89 as long as the feeder wire 75 is supplied with the positive D. C. voltage. Therefore, the particular control signal circuit which was originally actuated is automatically maintained closed until the pulse signal duration reaches the value governed by the rate of switching of the keying switch 66, regardless of when the function switch 79 or 80 is manually returned to its off position.

Thus it is insured that all transmitted control pulses have the same constant duration determined solely by the contour and speed of the pulse cam 51, and, therefore, each pulse is long enough to insure correct operation of all stepping relays. The selenium rectifier 70 and the relay rectifiers 94 are provided to isolate the various relays from each other and thus prevent any unwanted operation of the relays on reverse polarity current.

When using the above described control system in an airplane carrying crew members, such as in test flights, for example, a conventional communications radio set is normally employed for transmitting and receiving speech. Another feature of the present invention enables use of a single radio system to receive voice communication and control pulse signals in the airplane at the same time, without interference of the voice signals with the operation of the remote control system.

Figure 5:
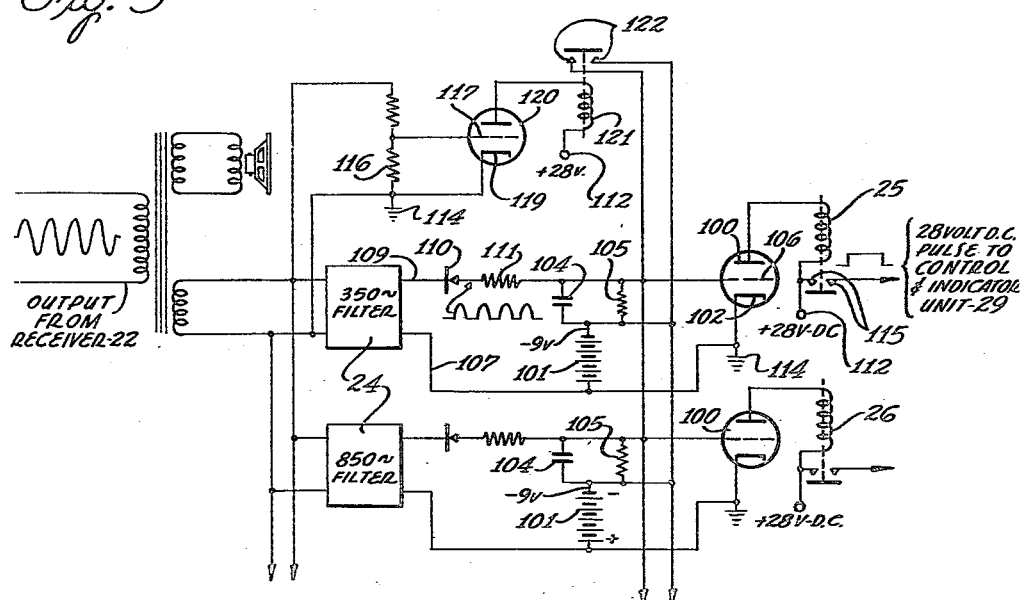
Figure 5 is a schematic wiring diagram showing a circuit for differentiating between signals of differing pulse width in the receiver output of Figure 1.

This is accomplished in the aircraft by the apparatus shown in Figure 5. Here the audio output from the receiver 22, which may be a standard V. H. F. communications receiver, is fed simultaneously to the four filter units 24, only two of which are illustrated fully in the drawing. Each filter output feeds the grid circuit of a relay tube 100 for the particular tone passed by the filter. This grid circuit contains a bias source, such as a battery 101, with its positive end connected to the cathode 102 of the relay tube 100, and a condenser 104 and grid resistor 105 connected in parallel between the negative end of the battery 101 and the control grid 106 of the tube. One filter output lead 107 connects to the positive end of the bias battery 101, and another filter output lead 109 connects through a diode rectifier 110 and a series resistor 111 to the control grid 106.

The relay tube 100 is preferably of a type which operates with a 28 volt D. C. plate supply 112, the negative side of which is grounded at 114, thus permitting operation directly from the D. C. power mains of the aircraft. An example of such a tube is a type 28D7, and with this tube a bias of 9 volts is used. The plate circuit of the relay tube 100 carries one of the control relays 25—28 which, when the contacts 115 thereof are closed, supplies the control pulses for directly operating its corresponding stepping relay 30 or 31 in the control and indicator unit 29.

In addition to the filters 24, an input resistance 116 is also connected to receive signals from the receiver output, this resistance being connected between a triode grid 117 and a cathode 119 of a triode control tube 120. This tube also operates on the 28 volt plate supply 112, with the cathode 119 connected to ground 114, and a shorting relay 121 is wired in its plate circuit. Two shorting relay contacts 122, which are closed when the relay is energized, are connected in parallel with all the grid resistors 105 and condensers 104 of the relay tubes 100.

For the condition of no output from the receiver 22, the relay tubes 100 are non-conducting because of the bias provided by the bias batteries 101, and the control tube 120 is conducting heavily because of zero bias on its triode grid 117. The control relays 25—28 are, therefore, de-energized and the control relay contacts 115 open, while the shorting relay 121 is energized and the shorting relay contacts 122 are closed, thereby short-circuiting the grid condensers 104.

When using the apparatus shown in Figure 5 in connection with a standard communications receiver, the speed of the timing motor 50 and the contour of the pulse cam 51 are preferably designed to produce a control pulse duration of approximately two seconds and a control pulse period of approximately three seconds. When a control tone produced by a pulse of this nature is received, the triode grid 117 is driven negative on each half cycle of the signal and, therefore, the plate current of the control tube 120 is reduced. The reduced current is insufficient to maintain energization of the shorting relay 121, so that the shorting relay contacts 122 open, and the grid condensers 104 and resistors 105 are unshorted. At the same time, one of the filters 24 passes the control tone for which it is designed, and a positive voltage builds up on the control grid 106 associated with that filter due to the rectifying action of the diode rectifier 110. When a critical value of control grid voltage is reached, the associated control relay 25—28 operates to apply a 28 volt pulse to its stepping relay in the control and indicator unit. Immediately after the end of the tone signal, the tubes and relays return to their initial conditions.

When voice communication is received, some voltage across the grid condensers 104 is developed during intermittent intervals when the shorting relay contacts 122 are opened by the presence of voice modulation across the input resistance 116. However, since the shorting relay 121 follows quite rapidly the voice inflections, which are shorter than the control tones, the voltage in the relay tube circuits is dissipated rapidly enough so that operation of the control relays 25—28 does not occur. Therefore, none of the stepping relays in the control unit 29 are actuated by normal voice communication signals, and it is readily seen that a single conventional aircraft receiver can be used as a link in the incremental control system, as well as a communications receiver, merely by modifying its output section to include the filters, relay tube circuits, and voice control tube circuit. In the case of a single unit operated as a transmitter-receiver, no control tones can be received when the airborne unit is being used as a transmitter, of course.

It is also seen that in the present invention, no zero-drift can possibly occur in the remote radio link, and that the reference member of the controlled device is, therefore, in a known position or attitude at all times. The controlled attitude is changed in definite incremental movements which are easily made small enough so that the effect is as smoothly proportional as that of a continuously variable system, both in extent and rate of control response. By having many small incremental steps, remote control equipment can be constructed which enables a remote operator to control the craft in a manner which simulates the smooth and normal feeling of direct control which a pilot on board the craft would have. For example, a pitch control member can be arranged to be rotated in a vertical plane imagined as containing the longitudinal axis of the craft, a bank control member can be arranged to move in a transverse vertical plane, and a throttle control member can be movable in a fore-and-aft direction, thus giving a simulated sense of conventional piloting procedures and making remote control simpler and easier for this reason.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A control system for remotely controlling the attitude of a device having a control member movable in either of two directions, which comprises electrical control pulse generating means, a radio transmitter having a first modulator adapted to produce a first modulation wave form of a constant predetermined frequency and a second modulator adapted to produce a second, different, predetermined modulation frequency, first switching means wired to operatively connect said first modulator into said transmitter only when closed, second switching means wired to operatively connect said second modulator into said transmitter only when closed to radiate two differently modulated waves, said control pulse generating means connected to close either of said switching means at will for a period of time equal to the width of each control pulse produced thereby, a receiver associated with said device and having a demodulator, two selective filters connected to said demodulator, and respectively tuned to each of said modulation frequencies, a first control circuit connected to one of said filters to be energized only while said first modulation frequency is being transmitted, a second control circuit connected to the other filter to be energized only while said second modulation frequency is being transmitted, dual-direction stepping means connected in said control circuits and having a stepping member arranged to be displaced one unit in one direction when said first control circuit is energized and displaced one unit in the opposite direction when said second control circuit is energized, driving means from said stepping member to said control member, said pulse generating means comprising a motor driven cam, a two-position electrical switch supplied with electrical power at its pole, cam follower means connected between said two-position switch and said cam, said cam being shaped to cause switching of said two-position switch from one position to the other at a predetermined constant rate to alternately supply said electrical power to the first of said positions, selector means operable to connect either of said switching means to said first position for constant pulsing of said switching means, cut-off circuit means wired to prevent a fractional pulse being sent to either of said switching means should said selector means be initially set in pulsing position while said two position switch is in said first position, and holding circuit means wired to prevent a fractional pulse being sent to either of said switching means should said selector means be withdrawn from pulsing position while said two-position switch is in said first position.

2. A control system for remotely controlling the attitude of a device having a control member movable in either of two directions, which comprises electrical control pulse generating means, a radio transmitter having a first modulator adapted to produce a first modulation wave form of a constant predetermined frequency and a second modulator adapted to produce a second, different, predetermined modulation frequency, first switching means wired to operatively connect said first modulator into said transmitter only when closed, second switching means wired to operatively connect said second modulator into said transmitter only when closed to radiate two differently modulated waves, said control pulse generating means connected to close either of said switching means at will for a period of time equal to the width of each control pulse produced thereby, a receiver associated with said device and having a demodulator, two selective filters connected to said demodulator, and respectively tuned to each of said modulation frequencies, a first control circuit connected to one of said filters to be energized only while said first modulation frequency is being transmitted, a second control circuit connected to the other filter to be energized only while said second modulation frequency is being transmitted, dual-direction stepping means connected in said control circuits and having a stepping member arranged to be displaced one unit in one direction when said first control circuit is energized and displaced one unit in the opposite direction when said second control circuit is energized, driving means from said stepping member to said control member, said pulse generating means comprising a motor-driven cam, a two-position electrical pulsing switch having its pole connected to the high side of an electrical power source, cam follower means connected between said pulsing switch and said cam, said cam being shaped to cause switching of said pulsing switch from one position to the other at a predetermined constant rate to alternately supply said electrical power to each of said positions, a double pole double throw selector switch with a center "off" position, means conecting a first pole of said selector switch to the grounded side of said power source, a first and a second control relay coil connected together at one end thereof, the other end of said first control coil connected to a first position of said pulsing switch, and the other end of said second control coil connected to a second position of said pulsing switch, means connecting the joined ends of said control coils to both throw positions of said selector switch first pole, a first pair of control relay contacts adapted to be closed when said first control relay coil is energized, means connecting one of said first pair to the joined ends of said control coils and means connecting the other of said first pair to said grounded power-source side, a second and third pair of control relay contacts, each pair adapted to be closed when said second control relay coil is energized, means connecting one of said second pair to said pulsing switch first position and means connecting the other of said second pair to a second pole of said selector switch, means conecting one of said third pair to said pulsing switch second position and means connecting the other of said third pair to said high power-source side, means connecting said first switching means to a first throw position of said selector switch second pole, means connecting said second switching means to a second throw position of said selector switch second pole, a first and a second holding relay coil mutually connected at one end thereof to said ground, the other end of said first holding coil connected to said first throw position of said selector switch second pole, and the other end of said second holding coil connected to said second throw posiiton of said selector switch second pole, a first and second pair of holding relay contacts respectively adapted to be closed when said first and second holding coils are respectively energized, said first holding pair being electrically connected between said selector switch second pole and said first throw position of said selector switch second pole, and said second holding pair being electrically connected between said selector switch second pole and said second throw position of said selector switch second pole.

3. A control system for remotely controlling the attitude of a device having a control member movable in either of two directions, which comprises electrical control pulse generating means, a radio transmitter having a first modulator adapted to produce a first modulation wave form of a constant predetermined frequency and a second modulator adapted to produce a second, different, predetermined modulation frequency, first switching means wired to operatively connect said first modulator into said transmitter only when closed, second switching means wired to operatively connect said second modulator into said transmitter only when closed to radiate two differently modulated waves, said control pulse generating means connected to close either of said switching means at will for a period of time equal to the width of each control pulse produced thereby, a receiver associated with said device and having a demodulator, two selective filters connected to said demodulator, and respectively tuned to each of said modulation frequencies, a first control circuit connected to one of said filters to be energized only while said first modulation frequency is being transmitted, a second control circuit connected to the other filter to be energized only while said second modulation frequency is being transmitted, dual-direction stepping means connected in said control circuits and having a stepping member arranged to be displaced one unit in one direction when said first control circuit is energized and displaced one unit in the opposite direction when said second control circuit is energized, driving means from said stepping member to said control member, said radio transmitter and receiver forming a complete voice communication system, said control pulses being substantially wider than normal voice signal pulses, and including pulse width differentiating means comprising means normally shorting out the input of said control circuits from said filters, and average power detecting means connected to the output of said receiver ahead of said filters to effectively remove said shorting means only when actuated by one of said control pulses, whereby voice modulation is positively prevented from reaching said control circuits.

4. A control system for remotely controlling the attitude of a device having a control member movable in either of two directions, which comprises electrical control pulse generating means, a radio transmitter having a first modulator adapted to produce a first modulation wave form of a constant predetermined frequency and a second modulator adapted to produce a second, different, predetermined modulation frequency, first switching means wired to operatively connect said first modulator into said transmitter only when closed, second switching means wired to operatively connect said second modulator into said transmitter only when closed to radiate two differently modulated waves, said control pulse generating means connected to close either of said switching means at will for a period of time equal to the width of each control pulse produced thereby, a receiver associated with said device and having a demodulator, two selective filters connected to said demodulator, and respectively tuned to each of said modulation frequencies, a first control circuit connected to one of said filters to be energized only while said first modulation frequency is being transmitted, a second control circuit connected to the other filter to be energized only while said second modulation frequency is being transmitted, dual-direction stepping means connected in said control circuits and having a stepping member arranged to be displaced one unit in one direction when said first control circuit is energized and displaced one unit in the opposite direction when said second control circuit is energized, driving means from said stepping member to said control member, said radio transmitter and receiver forming a complete voice communication system, said control pulses being substantially wider than normal voice signal pulses, and including pulse width differentiating means comprising an electronic control tube having a control grid, an anode, and a cathode, an input circuit connected to said control tube grid from the audio output of said receiver giving a bias potential of zero between said control tube grid and said control tube cathode when no signal is present, relay means connected in series with said control tube anode and having a pair of independent relay contacts which are closed when said relay means is energized by zero-bias anode current flow, a relay tube associated with each of said filters and having a control grid, an anode, and a cathode, a relay tube anode circuit for each of said relay tubes including means for energizing one of said control circuits when sufficient relay tube anode current flows, a grid circuit connected between the input of each relay tube and the output of its associated filter, said grid circuit having bias means connected between said relay tube grid and said relay tube cathode to cut off relay tube anode current flow when no signal is present at the output of said associated filter, a grid resistor and grid condenser each connected at one end thereof to said relay tube grid and connected at the other ends thereof in series with said bias means, a rectifier connected to permit current flow through said grid resistor only in the direction causing a positive increase in relay tube grid potential, the grid condenser in each of said grid circuits being connected across said relay contacts to be short-circuited when said contacts are closed, whereby a control tone in the output of said receiver will reduce said control tube anode current to open said relay contacts and allow current flow in one of said filters to cause conduction of its respective relay tube anode circuit to energize the associated control circuit, and whereby voice modulation in said receiver output will cause only intermittent opening of said relay contacts which is insufficient to allow critical relay tube grid potential rise to actuate any of said control circuits.

5. In a radio control system for remotely controlling a device having a plurality of movable control members, the combination of a receiver capable of handling voice communication in said device, a plurality of selective filters connected to the output of said receiver for selecting constant audio frequency control signals each having a distinctly wider duration than normal voice signals handled by said receiver, a plurality of control circuits connected to said filters to be respectively energized by only the desired signal passing through the respective filter, mechanical stepping means connected in said control circuits to be displaced a predetermined distance each time the respective control circuit is energized, driving means from said stepping means to said control members, means normally shorting out the inputs of said control circuits from said filters, and average power detecting means connected to said receiver output and to said shorting means, said detecting means having actuating means responsive to a critical amount of received energy to effectively remove said shorting means only when actuated by a control signal wider in duration than normal voice signals, whereby voice communication is positively prevented from reaching said control circuits, and only said wider control signals are passed to operate said control members.

6. In combination with a pulse-operated radio control system having a transmitter and a plurality of modulators normally disconnected from said transmitter; electrical control pulse generating means comprising a two-position electrical switch adapted to be supplied with electrical power at its pole, a motor-driven cam, cam follower means connected between said two-position switch and said cam, said cam being shaped to cause switching of said two position switch from one position to another at a predetermined rate to alternately supply electrical power to the first of said positions, a plurality of switching means wired to operatively connect said modulators respectively into said transmitter only when closed, selector means operable to connect any one of said switching means to said first position of said two-position switch for constant pulsing closed and open of said switching means, cut-off circuit means wired to prevent a fractional pulse being sent to any of said switching means should said selector means be initially set in pulsing position while said two-position switch is in said first position, and holding circuit means wired to prevent a fractional pulse being sent to any of said switching means should said selector means be withdrawn from pulsing position while said two-position switch is in said first position.

7. In combination with a pulse-operated radio control system having a transmitter and a plurality of modulators normally disconnected from said transmitter; electrical control pulse generating means comprising a two-position electrical pulsing switch adapted to be connected at its pole with one side of an electrical power supply, a motor-driven cam, cam follower means connected between said pulsing switch and said cam, said cam being shaped to cause switching of said pulsing switch from one position to the other at a predetermined rate to alternately supply electrical power to each of said positions, a plurality of switching means wired to operatively connect said modulators respectively into said transmitter only when closed, selector means operable to connect any of said switching means to said first position of said pulsing switch for constant pulsing closed and open of said switching means, each of said selector means being a double-pole selector switch with "off" position, means connecting a first pole of said selector switch to the opposite side of said power supply, a first and a second control relay coil connected together at one end thereof, the other end of said first control coil connected to a first position of said pulsing switch, and the other end of said second control coil connected to a second position of said pulsing switch, means connecting the joined ends of said control coils to the "on" position of said selector switch first pole, a first pair of control relay contacts adapted to be closed when said first control relay coil is energized, means connecting one of said first pair to the joined ends of said control coils and means connecting the other of said first pair to said power supply opposite side, a second and third pair of control relay contacts, each pair adapted to be closed when said second control relay coil is energized, means connecting one of said second pair to said pulsing switch first position and means connecting the other of said second pair to a second pole of said selector switch, means connecting one of said third pair to said pulsing switch second position and means connecting the other of said third pair to said power supply one side, each of said switching means connected to the "on" position of its respective selector switch second pole, a holding relay coil having one end thereof connected to said power supply opposite side and the other end thereof connected to said "on" position of said selector switch second pole, and a pair of holding relay contacts adapted to be closed when said holding relay coil is energized, said holding contacts being electrically connected between said selector switch second pole and said "on" position of said selector switch second pole.

(References on following page)

References Cited in the file of this patent

UNITED STATES PATENTS

| | | |
|---|---|---|
| 559,903 | Pfatischer | May 12, 1896 |
| 1,792,937 | Sperry | Feb. 17, 1931 |
| 1,818,708 | Hammond | Aug. 11, 1931 |
| 1,924,857 | Hodgman | Aug. 29, 1933 |
| 2,292,387 | Markey | Aug. 11, 1942 |
| 2,353,335 | Heintz et al. | July 11, 1944 |
| 2,436,787 | Bray | Mar. 2, 1948 |
| 2,451,917 | Chilowsky | Oct. 19, 1948 |
| 2,473,907 | Ridgely et al. | June 21, 1949 |
| 2,522,705 | Dewar | Sept. 19, 1950 |
| 2,532,321 | McCurtain | Dec. 5, 1950 |
| 2,551,972 | Schaelchlin et al. | May 8, 1951 |